Feb. 18, 1964     R. W. MORAN     3,121,597
RETAINER FOR ANTI-FRICTION BEARINGS
Filed April 6, 1961     2 Sheets-Sheet 1

INVENTOR.
RONALD W. MORAN
BY
Roy C. Hopgood
ATTORNEY

Feb. 18, 1964  R. W. MORAN  3,121,597

RETAINER FOR ANTI-FRICTION BEARINGS

Filed April 6, 1961  2 Sheets-Sheet 2

*INVENTOR.*
RONALD W. MORAN

BY Ray C. Hopgood

ATTORNEY

United States Patent Office 3,121,597
Patented Feb. 18, 1964

3,121,597
RETAINER FOR ANTI-FRICTION BEARINGS
Ronald W. Moran, New Britain, Conn., assignor to The Fafnir Bearing Company, New Britain, Conn., a corporation of Connecticut
Filed Apr. 6, 1961, Ser. No. 101,130
10 Claims. (Cl. 308—201)

The present invention, generally, relates an anti-friction bearings and, more particularly, to a new and improved ball retainer for anti-friction bearings.

A principal object of the invention is to provide a new and improved structural arrangement for a ball bearing retainer.

It is also an object of the invention to provide a retainer for anti-friction bearings which admits of advantages heretofore unrealized.

Another object of the present invention is to provide a new and improved anti-friction ball bearing which avoids the heretofore characteristically high break-in temperatures.

Still another object of the invention is to provide an anti-friction bearing which operates at lower bearing temperatures than has been achieved in the past.

It has been discovered that a ball bearing having a retainer in accordance with the present invention eliminates, for practical purposes, the heretofore objectionably high break-in temperatures and the long duration of the time before equilibrium temperature is reached. The lower operating temperatures permited by a bearing constructed in accordance with the present invention appreciably increases the life of the lubricant and the life of the bearing itself.

Briefly, the invention provides the objects, features and advantages mentioned above together with other and further objects, features and advantages by forming the annular retainer member with a reduced thickness in the vicinity of each hole that accommodates a ball. A preferred form of this structure is characterized by a groove which extends around the outer peripheral surface of the retainer and is of a width at least equal to the diameter of the ball holes.

The invention will be understood better from a perusal of the following detailed description taken in connection with the accompanying drawings, in which.

Figure 11:
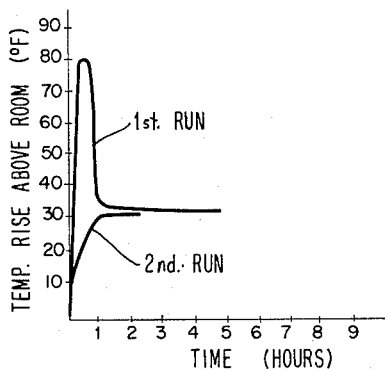
Figure 12:
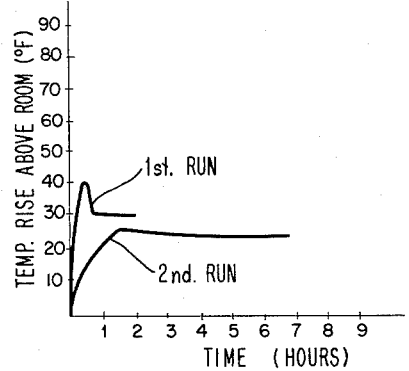

FIG. 11 is a time-temperature characteristic curve series for a bearing having a retainer with a channel in the outer peripheral surface having a width substantially equal to the diameter of the ball holes; and FIG. 12 is a time-temperature characteristic curve series for a bearing having a retainer with a channel in the outer peripheral surface having a width greater than the diameter of the ball holes.

Figure 1:
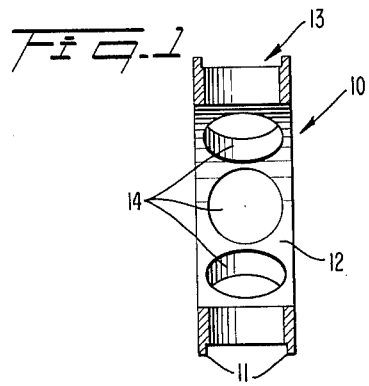
FIG. 1 is a view in cross section of a bearing retainer in accordance with a preferred form of the invention.
Figure 2:
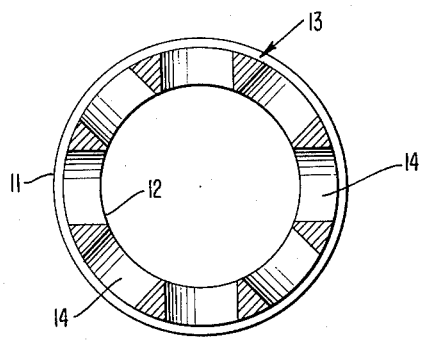
FIG. 2 is a plan view of the retainer shown in FIG. 1.

Referring now particularly to FIGS. 1 and 2 of the drawings, a ball retainer in accordance with a preferred form of the invention is formed with a body indicated generally by the numeral 10 having an outer peripheral surface 11 and an inner peripheral surface 12. A plurality of holes or ball pockets 14 are formed in the body 10 to receive balls. Each hole or ball pocket 14 is formed with a substantially continuous internal cylindrical surface having a diameter only slightly larger than the ball which it receives.

A channel or recess 13 is machined or otherwise formed in the outer surface 11. The width of the recess 13 is greater than the ball pocket diameter, and the depth of the recess 13 is sufficient to make the material between the bottom of the recess and the pitch diameter of the retainer equal to 15–18 percent of the ball diameter.

Figure 3:
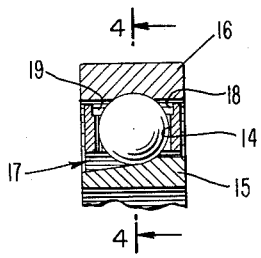
FIG. 3 is a view in cross section of a partial bearing embodying the features of the invention.
Figure 4:
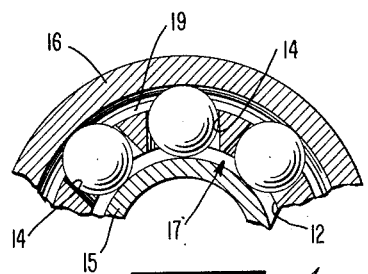
FIG. 4 is a view in cross section taken along the line 4—4 in FIG. 3.

In FIG. 3 of the drawings, inner and outer bearing rings 15 and 16, respectively, are formed in a conventional manner, the outer ring 16 being recognized as a Conrad type construction, but the inner ring 15 has a counterbore 17 on one side. The retainer in FIG. 3 is guided on the outer ring 16; or in other words, the retainer is outer land riding. This means that a close radial running clearance is maintained between the retainer outside diameter and the bore of the outer ring 16 for guidance purposes.

It is believed that a high break-in temperature and a long period of time before an equilibrium temperature is reached in prior bearings with outer land riding retainers is attributable to centrifugal forces at high operating speeds. The centrifugal action of the inner ring, retainer and balls causes an outward radial movement of the lubricant.

A result of the above is rapid build-up of lubricant in the area between the close running clearances maintained between the retainer outer diameter and the outer ring bore. Practically all of the lubricant remaining in the bearing is confined in this area.

The close running clearance restricts easy escapement of the lubricant. With some types of lubricant, considerable churning occurs, and this is manifested by an appreciable rise in operating temperature of the bearing. Several hours may be required before the churning lubricant is expelled from the bearing and before an equilibrium operating temperature is obtained.

In accordance with the present invention, however, the channel or recess 13 provides an appreciable increase in volume into which the outwardly directed lubricant may move. Obviously, the outward radial movement of the lubricant due to the effects of centrifugal force will still exist.

A particularly unique feature of the invention is obtained by a channel or recess which is wider than the diameter of the ball pockets. The increased width permits a bead of lubricant to accumulate along opposite edges 18 and 19, FIG. 3, of the recess 13 where the lubricant is less active.

It has been found that the increase in available lubricant space which permits lubricant accumulation in the recess laterally adjacent the ball path appreciably reduces the churning action or milling of the lubricant. Also, the retainer construction of the invention permits easier escapement of the excess lubricant which the operating bearing tends to expel.

Actual tests with a bearing in accordance with the invention have indicated that a channeled retainer as described above permits a larger quantity of grease to be introduced initially into the bearing than with heretofore known constructions, and the improved bearing still maintains a low maximum break-in temperature, short leveling time (at which an equilibrium operating temperature is reached), and a low ultimate operating temperature.

Figure 5:
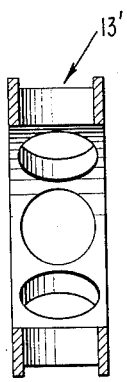
FIG. 5 is a view similar to FIG. 1 showing a modified form of the bearing retainer of the invention.

The modified form of the ball retainer shown in FIG. 5 permits most of the desirable characteristics described in connection with FIG. 1 of the drawings, the principal difference in the characteristics being only in degree. The form shown in FIG. 5 has a channel or recess 13' the width of which is just equal to the ball pocket diameter.

Figure 6:
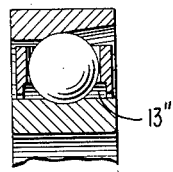
FIG. 6 is a view similar to FIG. 3 showing another modification in accordance with the invention.

A further modification is shown in FIG. 6 of the drawings, which construction is primarily for an inner land riding retainer. The recess 13" is machined or otherwise formed into the bore of the retainer, thus permitting a bead of lubricant to build up and be confined in an area that is in proximity to the balls.

Figure 7:
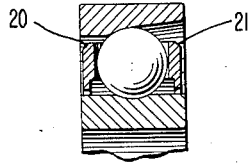
FIG. 7 is a view similar to FIG. 6 showing still another modification in accordance with the invention.

FIG. 7 illustrates that to accelerate the rate of discharge of lubricant from the bearing during the initial break-in run and to reduce the amount of churning, $\frac{1}{16}$ by 45 degrees bevels 20 and 21 are formed on each outside peripheral edge of the retainer.

Figure 8:
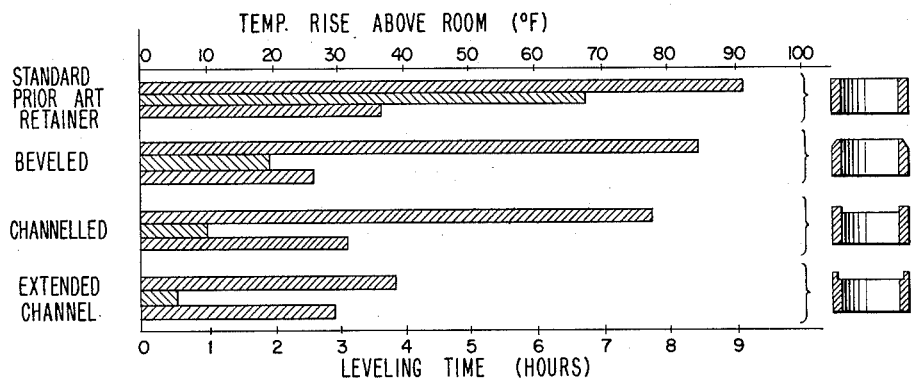
FIG. 8 is a comparative chart showing relative temperatures.
Figure 9:
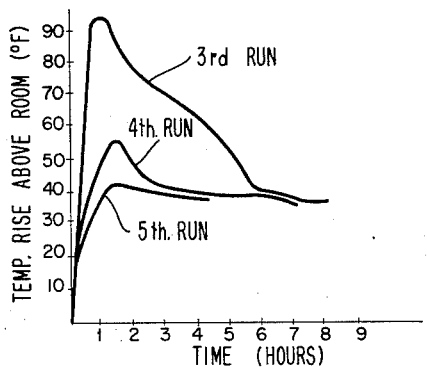
FIG. 9 is a time-temperature characteristic curve series for a bearing having a standard retainer such as used in the past.
Figure 10:
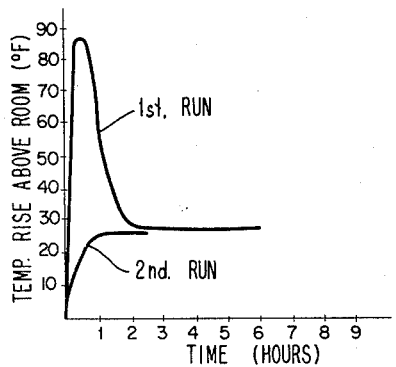
FIG. 10 is a time-temperature characteristic curve series for a bearing having a standard retainer with outer peripheral edges beveled.

In the chart of FIG. 8, a comparison is made of the new-bearing performance of greased bearing assemblies having retainers constructed according to the four generalized different cross-sectional configurations shown (against brackets) at the right-hand side of the chart. The first of these configurations represents the standard prior-art type of retainer, characterized as a right-cylindrical annulus with spaced radial ball sockets. The second represents modification, to the extent that the radially outer edges are beveled. The third represents a channelled form in which the outwardly facing radial groove is of the same width as is the diameter of the ball pockets. The fourth and final configuration is as described in connection with FIG. 1, with the channel groove wider than the ball-pocket diameter, so as to define a circumferentially continuous groove between spaced radially outwardly extending walls which may pilot on the outer bearing ring.

For each of the retainer configurations of FIG. 8, there is shown a cluster of three shaded graph bars representing typical observed temperature-rise conditions, with respect to ambient (room) temperature. In each case, the upper bar represents maximum temperature rise noted for a selected run of a particular bearing (at a given load and speed); the second bar represents the leveling time, i.e. time (in hours) required for the bearing to break-in to a reduced or level operating temperature; and the third bar represents the leveling temperature.

In FIGS. 9 to 12, there are shown the detailed observations for typical bearings in each of the four selected retainer categories, all presenting temperature as a function of time, for several selected runs of given bearings. Correlation will be observed between FIGS. 8 and 9 for the "3rd run" of a "standard" configuration, in that maximum temperature above ambient is a little over 90° F., the leveling time is between 6 and 7 hours, and the leveled temperature is about 37° F. For the "beveled" configuration of FIG. 10, correlation is seen between the plotted "1st run" and the second cluster of bar graphs in FIG. 8. Similarly, in FIG. 11, the "channelled" retainer performance is depicted, the "1st run" being shown as the third bar-graph cluster of FIG. 8. Finally, the "extended channel" of FIG. 12 is summarized, for its "1st run" performance, in the lower-most cluster of FIG. 8.

In all the time plots of FIGS. 9 to 12, later runs for the same bearings are included, not only to demonstrate how initial temperatures rise may be held to a minimum in accordance with teachings of the invention, but also to demonstrate how quickly break-in can be achieved. For example, in the "standard" configuration, the first two runs were characterized by temperature rises too large to plot, and even on the fifth run, the initial rise exceeds leveling temperature. On the other hand, with each structural change approaching the "extended channel," there is a marked reduction in initial temperature rise and the time required to "level."

While the retainer may be formed in any other manner not described specifically such as, for example, in two separate members fitted together, it is shown in the drawings as being of a unitary body member merely for simplicity of illustration. Also, the retainer may be formed of any suitable material, and the bearing embodying the retainer may be either grease or oil lubricated.

It will be understood that the term "ball" bearing referred to in the preceding description is for illustration purposes only, the invention not being limited to any specific anti-friction rolling member. Similarly, while it has been shown and described that the recess or channel may be in the outer surface of the retainer or in the inner surface, obviously it could be in both surfaces if so desired.

The following claims are intended to define the valid scope of this invention over the prior art and to cover all changes and modifications falling within the true spirit and valid scope of the invention.

I claim:

1. A retainer for a ball bearing comprising an annular ring-shaped body member, said body member having a circumferentially continuous central portion of reduced thickness between radially outwardly extending flanges thereon, whereby an uncluttered circumferentially continuous groove is defined between axial ends of said body member, said flanges each being formed with opposed parallel walls, said body member having a plurality of generally radial holes for receiving balls, each of said holes being formed with a substantially continuous internal cylindrical surface of the same given diameter, and said reduced thickness portion of said body member being at least in the vicinity of each hole of said plurality of holes, whereby all ball-receiving holes communicate with said groove.

2. A retainer for a ball bearing comprising an annular ring-shaped body member, having a predetermined thickness, said body member having a plurality of generally radial holes for receiving balls, each of said holes being formed with a substantially continuous internal cylindrical surface of the same given diameter, and the thickness of said body member for the entire circumferential extent being less in the area about each of said holes relative to the thickness at the peripheral edges, said peripheral edges comprising radially outwardly extending flanges each formed with opposed parallel walls, whereby an uncluttered circumferentially continuous groove communicates with all said holes.

3. A retainer for a ball bearing comprising an annular ring-shaped body member having a predetermined thickness and having outer and inner peripheral face surfaces, said body member having a plurality of generally radial holes for receiving balls, each of said holes being formed with a substantially continuous internal cylindrical surface of the same given diameter, a channel portion formed in the outer face surface of said body member and having a width at least equal to said diameter and having a length extending substantially uniformly around the outer peripheral face surface of said body member, said channel portion defining between axial ends of said body member an uncluttered circumferentially continuous groove communicating with all said holes.

4. A retainer for a ball bearing comprising an annular ring-like body member having a predetermined thickness and having outer and inner peripheral face surfaces, said body member having a plurality of generally radial holes for receiving balls, each of said holes being formed with a substantially continuous internal cylindrical surface of the same given diameter, a channel portion formed in the outer face surface of said body member and having a width greater than said diameter of said holes and having a length extending substantially uniformly around the outer peripheral face surface of said body member, said channel portion defining between axial ends of said body member an uncluttered circumferentially continuous groove straddling diametral limits of all said holes.

5. A ball bearing having inner and outer rings, a plurality of balls positioned between said inner and outer rings, and a ball retainer to separate each ball of said plurality and maintain said balls in a predetermined spatial relationship, said retainer comprising a ring-like body member having a plurality of ball pockets and an uncluttered circumferentially continuous annular recess in the vicinity of the outer bearing ring for receiving lubricant forced outwardly during use due to centrifugal forces, said annular recess being formed between a pair of radially outwardly extending flanges at axial ends of said retainer which are adapted to ride on said outer bearing ring as the bearing is rotated, said pockets each being formed with a substantially continuous internal cylindrical surface having a diameter slightly larger than the ball associated therewith.

6. A ball bearing having inner and outer rings, a plurality of balls positioned between said inner and outer rings, and an outer land riding ball retainer to separate each ball of said plurality and maintain said balls in a predetermined spatial relationship, said retainer comprising a ring-like body member having a predetermined outer diameter to fit relatively closely within said outer bearing ring and having a plurality of ball pockets, said pockets each being formed with a substantially continuous internal cylindrical surface having a diameter slightly larger than the ball associated therewith, and said body member having an uncluttered circumferentially continuous channel formed therein in the surface closest to said outer bearing ring for receiving lubricant forced outwardly during use due to centrifugal forces.

7. A ball bearing having inner and outer bearing rings, a plurality of balls positioned between said inner and outer rings, and a land riding ball retainer guided by a predetermined one of said inner and outer bearing rings to separate each ball of said plurality and to maintain said balls in a predetermined spatial relationship, said retainer comprising a ring-like body member having inner and outer annular surfaces and having a predetermined diameter to fit relatively closely with said predetermined one of said inner and outer bearing rings so that one of said annular surfaces is guided thereby, means cooperating with said one annular surface to define an uncluttered circumferentially continuous channel for receiving lubricant during use, and a plurality of pockets in said body member receiving said balls, said pockets each being formed with a substantially continuous internal cylindrical surface having a diameter slightly larger than the ball associated therewith.

8. A ball bearing having inner and outer bearing rings, a plurality of balls positioned between said inner and outer rings, and a land riding ball retainer guided by a predetermined one of said inner and outer bearing rings and having ball pockets to separate each ball of said plurality and to maintain said balls in a predetermined spatial relationship, said pockets each being formed with a substantially continuous internal cylindrical surface having a diameter slightly larger than the ball associated therewith, said retainer comprising a ring-like body member having inner and outer annular surfaces and having a predetermined diameter to fit relatively closely with said predetermined one of said inner and outer bearing rings so that one of said annular surfaces is guided thereby, and means including an uncluttered circumferentially continuous annular channel greater in width than the diameter of said ball pockets for receiving lubricant during use.

9. A ball bearing having inner and outer rings, a plurality of balls positioned between said rings, and a ball retainer for guiding and maintaining said balls in predetermined spatial relationship with respect to one another, said retainer comprising a ring-like body member having a plurality of ball pockets, said pockets each being formed with a substantially continuous internal cylindrical surface having a diameter which closely conforms to the diameter of the ball associated therewith, said body member having flanges protruding radially outwardly at the axial ends of said body member to thereby define a substantially enclosed annular grease receiving chamber between said outer ring and said body member, and said flanges having a predetermined diameter to thereby provide a close radial running clearance with said outer ring, whereby the break-in time and temperature of said bearing are materially reduced and the normal operating temperature of said bearing is also reduced.

10. A retainer for a ball bearing comprising an annular ring-shaped body member having a predetermined thickness and having outer and inner peripheral face surfaces, said body member having a plurality of generally radial holes for receiving balls, each of said holes being formed with a substantially continuous internal cylindrical surface of the same given diameter, a channel portion formed in one of said peripheral face surfaces of said body member and having a width at least equal to said diameter and having a length extending substantially uniformly around said one peripheral face surface, said channel portion defining between axial ends of said body member an uncluttered circumferentially continuous groove communicating with all said holes.

References Cited in the file of this patent

UNITED STATES PATENTS

| 2,975,008 | Ruley | Mar. 14, 1961 |
|---|---|---|
| 3,022,124 | Borden | Feb. 20, 1962 |

FOREIGN PATENTS

| 852,128 | France | Oct. 16, 1939 |
|---|---|---|
| 1,135,911 | France | Dec. 22, 1956 |